(12) United States Patent
Sato et al.

(10) Patent No.: US 6,660,816 B2
(45) Date of Patent: Dec. 9, 2003

(54) PROCESS FOR PREPARING OLEFIN POLYMERS

(75) Inventors: Hideki Sato, Niihama (JP); Hiroaki Katayama, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/797,705

(22) Filed: Mar. 5, 2001

(65) Prior Publication Data

US 2001/0008927 A1 Jul. 19, 2001

Related U.S. Application Data

(63) Continuation of application No. 09/125,519, filed as application No. PCT/JP97/04717 on Dec. 19, 1997, now abandoned.

(30) Foreign Application Priority Data

| Dec. 20, 1996 | (JP) | ............................................. 08-341988 |
| Jan. 14, 1997 | (JP) | ............................................. 09-005033 |
| Jan. 14, 1997 | (JP) | ............................................. 09-005034 |
| Jul. 4, 1997 | (JP) | ............................................. 09-179693 |

(51) Int. Cl.$^7$ ............................. C08F 4/44; B01J 31/38
(52) U.S. Cl. ................... 526/133; 526/134; 526/154; 526/160; 526/161; 526/943; 502/118; 502/152; 502/155
(58) Field of Search ................... 526/160, 161, 526/172, 133, 134, 154, 348.6, 88, 943; 502/118, 152, 155

(56) References Cited

U.S. PATENT DOCUMENTS

| 4,542,199 A | | 9/1985 | Kaminsky et al. |
| 5,624,878 A | * | 4/1997 | Devore et al. ............. 502/152 |
| 5,693,728 A | | 12/1997 | Okamoto et al. |
| 5,703,181 A | | 12/1997 | Tashiro et al. |
| 5,703,187 A | | 12/1997 | Timmers |
| 5,883,204 A | * | 3/1999 | Spencer et al. ............. 526/134 |

FOREIGN PATENT DOCUMENTS

| EP | 0436399 A2 | 7/1991 |
| EP | 0656373 A2 | 6/1995 |
| EP | 0714920 A1 | 6/1996 |
| EP | 0717797 A2 | 7/1996 |
| EP | 0842939 A1 | 5/1998 |
| JP | 58-019309 A | 2/1983 |
| JP | 03-163088 A | 7/1991 |
| JP | 03-188092 A | 8/1991 |
| JP | 06-157651 A | 6/1994 |
| JP | 07-138311 A | 5/1995 |
| WO | WO88/05793 A1 | 8/1988 |
| WO | WO94/03506 A1 | 2/1994 |

OTHER PUBLICATIONS

US 5,168,111, 12/1992, Canich (withdrawn)

* cited by examiner

Primary Examiner—Robert D. Harlan
(74) Attorney, Agent, or Firm—Birch, Stewart, Kolasch & Birch, LLP

(57) ABSTRACT

A method for producing an olefin polymer, characterized in that an olefin is homopolymerized or copolymerized in the presence of a catalyst for olefin polymerization, having the following (A) and (C) as catalyst components, or a catalyst for olefin polymerization, having the following (A), (B) and (C) as catalyst components:

(A) a transition metal complex dissolved, suspended or slurried in an aliphatic hydrocarbon compound;

(B) an organoaluminum compound or aluminoxane selected from compounds (B1) to (B3) dissolved, suspended or slurried in an aliphatic hydrocarbon compound; and (C) at least one boron compound selected from compounds (C1) to (C3) suspended or slurried in an aliphatic hydrocarbon compound.

3 Claims, 1 Drawing Sheet

PROCESS FOR PREPARING OLEFIN POLYMERS

This application is a continuation of application Ser. No. 09/125,519, filed on Aug. 20, 1998, now abandoned, and for which priority is claimed under 35 U.S.C. §120. application Ser. No. 09/125,519 is the national phase of PCT International Application No. PCT/JP97/04717 filed on Dec. 19, 1997 under 35 U.S.C. §371. The entire contents of each of the above-identified applications are hereby incorporated by reference. This application also claims priority of Application No. 8-341988, 9-005033, 9-005034 and 9-179693 filed in Japan on Dec. 20, 1996, Jan. 14, 1997, Jan. 14, 1997 and Jul. 4, 1997, respectively under 35 U.S.C. §119.

TECHNICAL FIELD

The present invention relates to a method for producing an olefin polymer. More particularly, the present invention relates to a method for producing an olefin polymer using a transition metal compound represented by a metallocene complex, which does not require use of an aromatic hydrocarbon as a solvent.

In the present invention, the olefin polymer includes a homopolymer of an olefin and a copolymer of a plurality of olefins.

BACKGROUND ART

It has been reported that a catalyst for polymerization, comprising a transition metal compound, particularly a diimine complex or a transition metal complex containing one or two groups having a cyclopentadiene type anionic skeleton, e.g. a so-called non-metallocene complex or metallocene complex, respectively, and aluminoxane exhibits a high activity. Particularly, when the metallocene complex is used, an olefin polymer having narrow molecular weight distribution and composition distribution, that is, the resulting olefin polymer exhibits considerably useful feature from industrial point of view. Therefore, a lot of reports have recently been made (e.g. Japanese Patent Publication (Kokai) No. Sho 58-19309). It has also been reported that high activity is exhibited in the olefin polymerization in case of a system using no aluminoxane, that is, in a method using a specific boron compound (e.g. Japanese Patent Publication (Kohyo) No. Hei 1-502036, Japanese Patent Publication (Kokai) Nos. Hei 6-157651, Hei3-163088 and Hei3-188092).

Since already known transition metal compounds such as ethylenebis(indenyl)zirconium dichloride, isopropylidene (cyclopentadienyl)(fluorenyl)zirconium dichloride, dimethylsilyl(tert-butylamide) (tetramethylcyclopentadienyl)titanium dichloride, etc. are soluble in an aromatic hydrocarbon solvent such as toluene, etc., but hardly dissolve in an aliphatic hydrocarbon solvent. Therefore, the transition metal compound was normally handled in the form of a solution of the aromatic hydrocarbon solvent.

Furthermore, the above boron compound is a particulate solid and has a problem that it dissolves in the aromatic hydrocarbon solvent such as toluene, etc. to some extent but its solubility in the other solvent, particularly aliphatic hydrocarbon solvent, is very low. In general, in the polymerization of an olefin using a conventional transition metal compound, it is obliged to use the aromatic hydrocarbon solvent such as toluene, etc. Such a solvent is liable to remain in a polymer as the product to give off an odor, resulting in a large problem.

DISCLOSURE OF THE INVENTION

An object of the present invention is to provide a method of producing an olefin polymer using a transition metal compound, which does not require use of an aromatic hydrocarbon solvent which is liable to remain in a polymer as the product to give off an odor.

That is, according to the present invention, there is provided a catalyst for olefin polymerization obtained using (A) and (C) described below or a method for producing an olefin polymer, which comprises homopolymerizing or copolymerizing olefins in the presence of a catalyst for olefin polymerization obtainable by using the following (A) (B) and (C) as catalyst components:

(A): a transition metal complex dissolved, suspended or slurried in an aliphatic hydrocarbon compound;

(B): a compound dissolved, suspended or slurried in an aliphatic hydrocarbon compound, which is selected from the following (B1) to (B3):

(B1) an organoaluminum compound represented by the general formula $E^1_a AlZ_{3-a}$;

(B2) a cyclic aluminoxane having a structure represented by the general formula $\{-Al(E^2)-O-\}_b$; and (B3) a linear aluminoxane having a structure represented by the general formula $E^3\{-Al(E^3)-O-\}_c AlE^3_2$ (wherein $E^1$ to $E^3$ respectively represents a hydrocarbon group having 1 to 8 carbon atoms, and all of $E^1$, $E^2$ and $E^3$ may be the same or different; Z represents a hydrogen atom or a halogen atom, and all of Z may be the same or different; a represents a numeral satisfying $0 < a \leq 3$; b represents an integer of not less than 2; and c represents an integer of not less than 1); and (C): at least one boron compound suspended or slurried in an aliphatic hydrocarbon compound, which is selected from the following (C1) to (C3):

(C1) a boron compound represented by the general formula $BQ^1Q^2Q^3$;

(C2) a boron compound represented by the general formula $G^+(BQ^1Q^2Q^3Q^4)^-$; and (C3) a boron compound represented by the general formula $(L-H)^+(BQ^1Q^2Q^3Q^4)^-$ (in each of the above general formulae, B is a boron atom in the trivalent valence state, $Q^1-Q^4$ are a halogen atom, a hydrocarbon group, a halogenated hydrocarbon group, a substituted silyl group, an alkoxy group or a di-substituted amino group, which may be the same or different, respectively. $G^+$ is an inorganic or organic cation, L is a neutral Lewis base, and $(L-H)^+$ is a Brønsted acid.)

The present invention will be described in detail hereinafter.

All of the components (A) and component (C) or the additional component (B), which constitute the catalyst for olefin polymerization of the present invention, do not require an aromatic hydrocarbon compound as a solvent. As the solvent for dissolving, suspending or slurrying these catalyst components, an aliphatic hydrocarbon solvent is used.

(A) Transition Metal Component

The component (A) of the catalyst for polymerizing an olefin used in the present invention is a dissolved, suspended or slurried transition metal component.

The transition metal compound is preferably a compound of Group III–XII or lanthanide series of the Periodic Table of the Elements (1993, IUPAC), and various transition metal compounds having an olefin polymerization activity (e.g. metallocene complex, non-metallocene complex, etc.) can be employed. A transition metal compound of Group IV or lanthanide series is more preferred, and a transition metal compound having at least one cyclopentadiene type anionic skeleton, i.e. metallocene transition metal compound is most preferred.

The metallocene transition metal compound is a compound represented by the following general formula (3):
General formula (3) $ML_aR^3_{p-a}$
(wherein M represents a transition metal compound of Group IV or lanthanide series of the Periodic Table of the Elements (1993, IUPAC); L represents a group having a cyclopentadiene type anionic skeleton or a group having a hetero atom, at least one of which is a group having a cyclopentadiene type anionic skeleton, and a plurality of L may be the same or different and may be crosslinked each other; $R^3$ represents a halogen atom or a hydrocarbon group having 1 to 20 carbon atoms; a represents a numeral satisfying $0<a\leq p$; and p represents a valence of a transition metal atom M).

In the general formula (3) representing the metallocene transition metal compound, M is a transition metal compound of Group IV or lanthanide series of the Periodic Table of the Elements (1993, IUPAC). Specific examples of the transition metal atom of Group IV include a titanium atom, a zirconium atom, a hafnium atom, etc., and specific examples of the transition metal atom of lanthanide series include a samarium atom. Among them, titanium atom, zirconium atom or hafnium atom is preferred.

In the general formula (3) representing the metallocene transition metal compound, L is a group having a cyclopentadiene type anionic skeleton or a group having a hetero atom, at least one of which is a group having a cyclopentadiene type anionic skeleton, and a plurality of L may be the same or different and may be crosslinked each other.

Examples of the group having a cyclopentadiene type anionic skeleton include $\eta^5$-cyclopentadienyl group, $\eta^5$-substituted cyclopentadienyl group or a polycyclic group having a cyclopentadiene type anionic skeleton. Examples of the substituent of the $\eta^5$-substituted cyclopentadienyl group include hydrocarbon group having 1 to 20 carbon atoms, halogenated hydrocarbon group having 1 to 20 carbon atoms or silyl group having 1 to 20 carbon atoms. Examples of the polycyclic group having a cyclopentadiene type anionic skeleton include $\eta^5$-indenyl group, $\eta^5$-fluorenyl group, etc.

Examples of the hetero atom in the group having a hetero atom include nitrogen atom, phosphorous atom, oxygen atom, sulfur atom, etc. Examples of the group having such a hetero atom include hydrocarbylamino group, hydrocarbylphosphino group, hydrocarbyloxy group, hydrocarbylthio group, etc., preferably alkoxy group, aryloxy group, alkylthio group, arylthio group, dialkylamino group, diarylamino group, dialkylphosphino group and diarylphosphino group.

Specific examples of the $\eta^5$-substituted cyclopenatdienyl group include $\eta^5$-methylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-isobutylcyclopentadienyl group, $\eta^5$-sec-butylcyclopentadienyl group, $\eta^5$-tert-butylcyclopentadienyl group, $\eta^5$-1,2-dimethylcyclopentadienyl group, $\eta^5$-1,3-dimethylcyclopentadienyl group, $\eta^5$-1,2,3-trimethylcyclopentadienyl group, $\eta^5$-1,2,4-trimethylcyclopentadienyl group, $\eta^5$-tetramethylcyclopentadienyl group, $\eta^5$-pentamethylcyclopentadienyl group, $\eta^5$-trimethylsilylcyclopentadienyl group, etc.

Specific examples of the polycyclic group having a cyclopentadiene type anionic skeleton include $\eta^5$-indenyl group, $\eta^5$-2-methylindenyl group, $\eta^5$-4-methylindenyl group, $\eta^5$-4,5,6,7-tetrahydroindenyl group, $\eta^5$-fluorenyl group, etc.

Specific examples of the group having a hetero atom include methoxy group, ethoxy group, propoxy group, butoxy group, phenoxy group, methylthio group, dimethylamino group, diethylamino group, dipropylamino group, dibutylamino group, diphenylamino group, pyrrolyl group, dimethylphosphino group, etc.

The groups having a cyclopentadiene type anionic skeleton, or the group having a cyclopentadiene type anionic skeleton and the group having a hetero atom may be crosslinked each other. In that case, an alkylene group (e.g. ethylene group, propylene group, etc.), a substituted alkylene group (e.g. dimethylmethylene group, diphenylmethylene group, etc.) or a substituted silylene group (e.g. silylene group, dimethylsilylene group, diphenylsilylene group, tetramethyldisilylene group, etc.) may exist between the groups.

$R^3$ in the general formula (3) representing the metallocene transition metal compound is a halogen atom or a hydrocarbon group having 1 to 20 carbon atoms. a is a numeral satisfying $0<a\leq p$, and p is a valence of a transition metal atom M. Specific examples of $R^3$ include a fluorine atom, a chlorine atom, a bromine atom, iodine atom as the halogen atom and methyl group, ethyl group, n-propyl group, isopropyl group, n-butyl group, phenyl group, benzyl group and the like as the hydrocarbon group having 1 to 20 carbon atoms. $R^3$ is preferably a chlorine atom, methyl group or benzyl group.

Among metallocene transition metal compounds, specific examples of the compound wherein the transition metal atom M is a zirconium atom include bis(cyclopentadienyl)zirconium dichloride, bis(methylcyclopentadienyl)zirconium dichloride, bis(pentamethylcyclopentadienyl)zirconium dichloride, bis(indenyl)zirconium dichloride, bis(4,5,6,7-tetrahydroindenyl)zirconium dichloride, bis(fluorenyl)zirconium dichloride, ethylenebis(indenyl)zirconium dichloride, ethylenebis(4,5,6,7-tetrahydroindenyl)zirconium dichloride, isopropylidene(cyclopentadienyl)(fluorenyl)zirconium dichloride, dimethylsilylenebis(cyclopentadienyl)zirconium dichloride, dimethylsilylenebis(4,5,6,7-tetrahydroindenyl)zirconium dichloride, dimethylsilylene(cyclopentadienyl)(fluorenyl)zirconium dichloride, diphenylsilylenebis(indenyl)zirconium dichloride, (cyclopentadienyl)(dimethylamide)zirconium dichloride, (cyclopentadienyl)(phenoxy)zirconium dichloride, dimethylsilyl(tert-butylamide)(tetramethylcyclopentadienyl)zirconium dichloride, bis(cyclopentadienyl)zirconium dimethyl, bis(methylcyclopentadienyl)zirconium dimethyl, bis(pentamethylcyclopentadienyl)zirconium dimethyl, bis(indenyl)zirconium dimethyl, bis(4,5,6,7-tetrahydroindenyl)zirconium dimethyl, bis(fluorenyl)zirconium dimethyl, ethylenebis(indenyl)zirconium dimethyl, dimethylsilyl(tert-butylamide)(tetramethylcyclopentadienyl)zirconium dimethyl, etc.

There can also be exemplified compounds wherein zirconium of the above zirconium compounds is replaced by titanium or hafnium.

These metallocene transition metal compounds may be used alone or in combination of two or more.

The component (A) of the catalyst for olefin polymerization used in the present invention is a transition metal compound dissolved, suspended or slurried in the aliphatic hydrocarbon compound, and a transition metal compound dissolved in the aliphatic hydrocarbon compound is preferably used.

Examples of the transition metal compound soluble in such an aliphatic hydrocarbon compound, include isopropylidene(cyclopentadienyl)(3-tert-butyl-5-methyl-2-phenoxy)titanium dichloride, dimethylsilyl (tetramethylcyclopentadienyl)(3-tert-butyl-5-methyl-2-phenoxy)titanium dichloride, etc.

(B) organometallic Component

The component (B) used in the present invention is a compound dissolved, suspended or slurried in an aliphatic hydrocarbon compound, which is selected from (B1) an organoaluminum compound represented by the general formula $E^1_aAlZ_{3-a}$, (B2) a cyclic aluminoxane having a structure represented by the general formula $\{—Al(E^2)—O—\}_b$ and (B3) a linear aluminoxane having a structure represented by the general formula $E^3\{—Al(E^3)—O—\}_cAlE^3_2$ (wherein $E^1$ to $E^3$ respectively represents a hydrocarbon group having 1 to 8 carbon atoms, all of $E^1$, all of $E^2$ and all of $E^3$ may be the same or different; Z represents a hydrogen atom or a halogen atom, and all of Z may be the same or different; a represents a numeral satisfying $0<a\leq3$; b represents an integer of not less than 2; and c represents an integer of not less than 1).

Specific examples of the organoaluminum compound (B1) represented by the general formula $E^1_aAlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane represented by the general formula $\{—Al(E^2)—O—\}_b$ and (B3) a linear aluminoxane having a structure represented by the general formula $E^3—\{Al(E^3)—O—\}_cAlE^3_2$ include alkyl group such as methyl group, ethyl group, n-propyl group, isopropyl group, n-butyl group, isobutyl group, n-pentyl group, neopentyl group, etc. b is an integer of not less than 2, c is an integer of not less than 1. Each of $E^2$ and $E^3$ is preferably methyl group or isobutyl group. b is from 2 to 40 and c is from 1 to 40.

The above aluminoxane is prepared by various methods. The method is not specifically limited, and the aluminoxane may be prepared according to a known method. For example, the aluminoxane is prepared by contacting a solution, which is obtained by dissolving a trialkylaluminum (e.g. trimethylaluminum, etc.) in a suitable organic solvent (e.g. benzene, aliphatic hydrocarbon, etc.) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Third Component

As the component (C) in the present invention, there can be used one or more boron compounds selected from the following (C1) to (C3):

(C1) a boron compound represented by the general formula $BQ^1Q^2Q^3$;

(C2) a boron compound represented by the general formula $G^+(BQ^1Q^2Q^3Q^4)^-$; and (C3) a boron compound represented by the general formula $(L-H)^+(BQ^1Q^2Q^3Q^4)^-$.

In the boron compound (C1) represented by the general formula $BQ^1Q^2Q^3$, B is a boron atom in the trivalent valence state; $Q^1$ to $Q^3$ may be the same or different and represent a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms. $Q^1$ to $Q^3$ are preferably a halogen atom, a hydrocarbon group having 1 to 20 carbon atoms or a halogenated hydrocarbon group having 1 to 20 carbon atoms.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B is a boron atom in the trivalent valence state; and $Q^1$ to $Q^4$ are as defined in $Q^1$ to $Q^3$ in the above (1).

Specific examples of $G^+$ as an inorganic cation in the compound represented by the general formula $G^+(BQ^1Q^2Q^3Q^4)^-$ include ferrocenium cation, alkyl-substituted ferrocenium cation, silver cation, etc. Examples of the $G^+$ as an organic cation include triphenylmethyl cation. $G^+$ is preferably a carbenium cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl) borate, tetrakis(2,3,4-trifluorophenyl)borate, phenyltris (pentafluorophenyl)borate, tetrakis(3,5-bistrifluoromethylphenyl)borate, etc.

Specific combination of these include ferroceniumtetrakis (pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl) borate, etc., most preferably triphenylmethyltetrakis (pentafluorophenyl)borate.

In the boron compound (C3) represented by the formula $(L-H)+(BQ^1Q^2Q^3Q^4)^-$, L represents a neutral Lewis base; $(L-H)^+$ represents a Brønsted acid; B represents a boron atom in the trivalent valence state; and $Q^1$ to $Q^4$ are as defined in $Q^1$ to $Q^3$ in the above (C1).

Specific examples of $(L-H)^+$ as a Brønsted acid in the compound represented by the general formula $(L-H)^+ (BQ^1Q^2Q^3Q^4)^-$ include trialkyl-substituted ammonium, N,N-dialkylanilinium, dialkylammonium, triarylphosphonium, etc., and examples of $(BQ^1Q^2Q^3Q^4)^-$ include those as defined above.

Specific combination of them includes triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl) borate, N,N-dimethylanilinium tetrakis(pentafluorophenyl) borate, N,N-diethylanilinium tetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammonium tetrakis (pentafluorophenyl)borate, dicyclohexylammonium tetrakis (pentafluorophenyl)borate, triphenylphosphonium tetrakis(pentafluorophenyl)borate, tri (methylphenyl)phosphoniumtetrakis(pentafluorophenyl) borate, tris(dimethylphenyl)phosphoniumtetrakis (pentafluorophenyl)borate, etc., and tri(n-butyl) ammoniumtetrakis(pentafluorophenyl)borate or N,N-dimethylanilinumtetrakis(pentafluorophenyl)borate is most preferable.

As the component (C), (C2) or (C3) is preferred and triphenylmethyltetrakis(pentafluorophenyl)borate or N,N-dimethylaniliniumtetrakis(pentafluorophenyl)borate is particularly preferred. N,N-dimethylaniliniumtetrakis (pentafluorophenyl)borate is most preferred.

[Catalyst for Olefin Polymerization]

In the present invention, as the catalyst for olefin polymerization, a catalyst for olefin polymerization, obtainable by using the above (A) and (C) as the catalyst component, or a catalyst for olefin polymerization, obtainable by using the above (A), (B) and (C) as the catalyst component is used. Preferably, a catalyst for olefin prepared by continuously feeding a part or all of the respective catalyst components in an apparatus for preparing a catalyst, or a catalyst for olefin prepared by continuously feeding the respective catalyst components in an apparatus for olefin polymerization is used. In case of feeding in the apparatus for preparing a catalyst or the apparatus for olefin polymerization, the respective catalyst components can be used by charging in an arbitrary order, but an arbitrary combination thereof may be used after previous contact.

In the present invention, the respective catalyst components are sometimes used in the state suspended or slurried in the aliphatic hydrocarbon compound. Herein, in the present invention, the state suspended or slurried in the solvent means the state in which a solid is not completely dissolved in the solvent but solid particles are dispersed in the solvent. In the present invention, the suspended state and slurried state are not particularly distinguished.

In the present invention, when the above respective catalyst components are fed in the state suspended or slurried in a solvent, the sedimentation velocity of each of the catalyst components in the suspended or slurried state is preferably lower than the flow velocity in a pipeline so that each of the catalyst components are not deposited in the pipeline.

In the present invention, the solvent used for dissolving, suspending or slurrying in the solvent is not specifically limited as far as it is an aliphatic hydrocarbon compound which causes no problem in use of the respective catalyst components. Specific examples thereof include butane, hexane, heptane, octane, cyclohexane, dodecane, liquid paraffins, etc.

In the present invention, it is preferable to use a solvent having a high viscosity so that the sedimentation velocity of the respective catalyst components in the suspended or slurried state is lower than the flow velocity in the pipeline. The viscosity of the solvent is preferably not less than 0.8 cp (centipoise), more preferably 1.4 to 1200 cp, most preferably 1.6 to 50 cp.

Specific examples of solvents having a high viscosity include dodecane, various liquid paraffins, mixed solvents of these with other solvents. As the liquid paraffins, for example, commercially available liquid paraffins having various viscosities within about 2 to about 2000 cp can be used. Besides, the viscosity referred to herein means the viscosity at 20° C.

Such a high-viscosity solvent is preferably used as the solvent of the above component (C), furthermore, preferably used as the solvent of the above components (C) and (A).

In the present invention, when a pipeline is used in case of feeding the respective catalyst components to the apparatus for preparing a catalyst or apparatus for olefin polymerization, a diameter of the pipeline is not specifically limited, but is from 0.5 to 100 mm, preferably from 1 to 50 mm, more preferably from 1.5 to 30 mm.

The concentration of the respective catalyst components is appropriately selected according to the conditions such as performances of the apparatus for feeding the respective catalyst components to a polymerization reactor, and the respective catalyst components are preferably used so that the concentration of (A) is normally from 0.01 to 500 μmol/g, preferably from 0.05 to 100 μmol/g, more preferably from 0.05 to 50 μmol/g; the concentration of (B) is normally from 0.01 to 10000 μmol/g, preferably from 0.1 to 5000 μmol/g, more preferably from 0.1 to 2000 μmol/g, in terms of Al atom; and the concentration of (C) is normally from 0.01 to 500 μmol/g, preferably from 0.05 to 200 μmol/g, more preferably from 0.05 to 100 μmol/g.

The above component (C) and majorities of the component (A) are soluble in an aromatic hydrocarbon solvent such as toluene, etc. to some extent, but hardly dissolve in an aliphatic hydrocarbon solvent. Although the amount of the above component (C) contained in the solution is small, particularly, the component (C) can be fed in a large amount and smaller volume by using a method of feeding the respective catalyst components in the suspended or slurried state in the solvent, favorably.

The above component (C) can be fed in the amount of 0.0001 to 800 mmol/liter, preferably 0.001 to 500 mmol/liter, in terms of the number of moles of the boron compound based on the volume of the solvent.

The respective catalyst components in the catalyst for olefin polymerization used in the present invention are preferably used so that a molar ratio of the component (B)/the component (A) is within the range from 0.1 to 10000, preferably from 5 to 2000, and a molar ratio of the component (C)/the component (A) is within the range from 0.01 to 100, preferably from 0.5 to 10.

As the olefin, which can be applied to the polymerization in the present invention, all of olefins having 2 to 20 carbon atoms can be used and two or more olefins can also be used, simultaneously. Specific examples of the olefin include straight-chain α-olefins such as ethylene, propylene, butene-1, pentene-1, hexene-1, heptene-1, octene-1, nonene-1, decene-1, etc.; branched α-olefins such as 3-methylbutene-1, 3-methylpentene-1, 4-methylpentene-1, 5-methyl-2-pentene-1, etc.; and vinylcyclohexane, but should not be limited to the above compounds in the present invention. Examples of the combination of olefins in the copolymerization include ethylene and propylene, ethylene and butene-1, ethylene and hexene-1, ethylene and octene-1, propylene and butene-1, etc., but should not be limited to these combinations in the present invention.

The present invention can be effectively applied to the preparation of the copolymer of ethylene and α-olefin (e.g. propylene, butene-1, 4-methylpentene-1, hexene-1, octene-1), particularly.

Also, the polymerization method should not be specifically limited. For example, there can be performed solvent polymerization or slurry polymerization using an aliphatic hydrocarbon such as butane, pentane, hexane, heptane, octane, etc. as the solvent, high-pressure ionic polymerization in the absence of a solvent under high temperature and high pressure, gas phase polymerization in a gaseous monomer, etc. The polymerization can be performed in a continuous manner or a batch-wise manner.

More preferably, the preferable polymerization method in the present invention includes a high-temperature solution method of polymerizing an olefin under the conditions of 120 to 250° C. and 5 to 50 kg/cm$^2$ where the polymer is molten, using a solvent such as cyclohexane, etc. and a high-pressure ionic polymerization method of polymerizing an olefin in a super critical fluid state under high temperature and high pressure in the absence of a solvent in the state where the produced polymer is molten.

More preferably, the polymerization is performed at under a pressure of at least 300 kg/cm$^2$, preferably 350 to 3500 kg/cm$^2$ at a temperature of at least 130° C., preferably 135 to 350° C. In this case, as a polymerization form, both of a batch-wise manner and a continuous manner are possible, but it is preferable to perform in the continuous manner. As a reactor, a stirring type vessel reactor or a tubular reactor can be used. The polymerization can be performed in a single reaction zone. Alternatively, the polymerization can also be performed by partitioning one reactor into a plurality of reaction zones or connecting a plurality of reactors in series or parallel. In case of using a plurality of reactors, both of a combination of a vessel reactor and another vessel reactor and a combination of a vessel reactor and a tubular reactor are used. In a method of polymerizing using a plurality of reaction zones or a plurality of reactors, polymers having different characteristics can also be produced by changing the temperature, pressure and gas composition of each reaction zone.

The respective catalyst components are normally fed to the reactor with a high-pressure pump. In such a polymerization under high pressure, for introducing the catalyst into the high-pressure portion with a pump, the catalyst is preferably liquid-form, is homogeneously dissolved in a solvent, or is particle small in a particle diameter and good in dispersity when it is solid insoluble in a solvent. In that case, the maximum particle diameter is preferably 50 μm or less, more preferably 30 μm or less, particularly 10 μm or less, most preferably 5 μm or less.

In order to control the particle diameter of the boron compound (C), there can be applied a pulverization method and a method of adding dropwise a solution obtained by dissolving it in toluene to an aliphatic hydrocarbon solvent such as heptane, etc. for precipitating.

A catalyst solution is normally handled under an inert gas atmosphere such as nitrogen, argon, etc. so that it is not brought into contact with water and air.

The polymerization time is appropriately determined according to the kind of the desired polymer and reactor, and the conditions are not specifically limited. In the present invention, a chain transfer agent such as hydrogen, etc. can also be added to control the molecular weight of the copolymer.

BEST MODE FOR CARRYING OUT THE INVENTION

Figure 1:
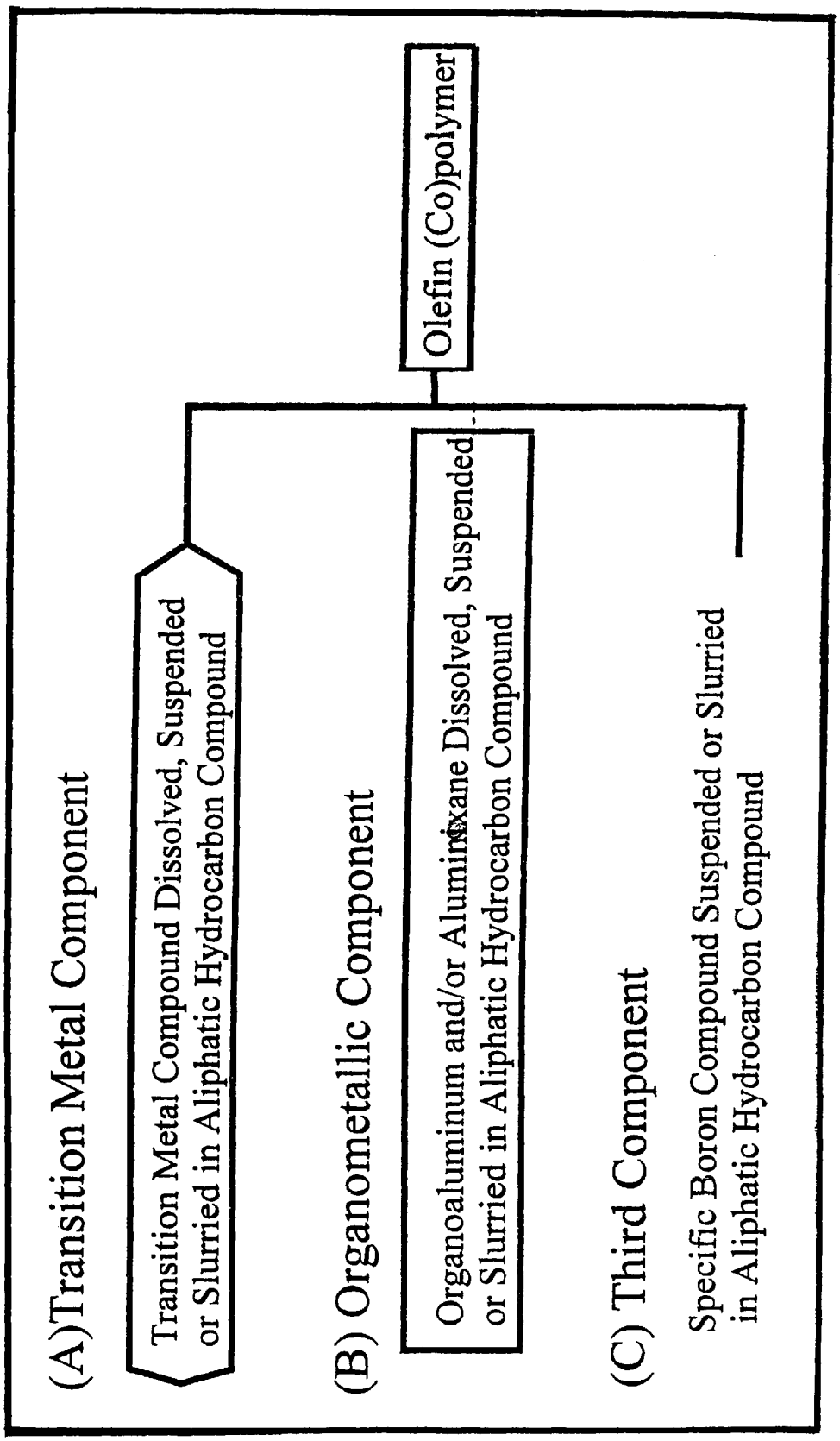
FIG. 1 is a flow chart for assisting the understanding of the present invention. This flow chart is a typical example of an embodiment of the present invention, and the present invention is not limited thereto.

The following Examples and Comparative Examples further illustrate the present invention in detail but are not to be construed to limit the scope thereof.

Properties of the polymers in the Examples were measured by the following methods.

(1) Melt index (MFR) was measured at 190° C. according to the method defined in JIS K-6760.
(2) The density was determined according to JIS K-6760. Provided that the value of the density described as the density (without annealing) is a value measured without subjecting to annealing, whereas the value of the density described as the density (with annealing) is a value measured after annealing.
(3) Melting point of copolymer: It was measured under the following conditions by using DSC7 manufactured by Perkin-Elmer Co.
    Heating: heating to 150° C. and maintaining at the same temperature until calorie is stabilized
    Cooling: cooling from 150 to 40° C. (5° C./min.) and maintaining for 2 minutes
    Measurement: from 10 to 150° C. (5° C./min.)
(4) Content of α-olefin: It was determined from characteristic absorption of ethylene and α-olefin by using an infrared spectrometer (FT-IR7300, manufactured by NIPPON BUNKO Inc.) and was shown as the short-chain branch (SCB) number per 1000 carbon atoms.
(5) Molecular weight and molecular weight distribution: They were determined under the following conditions by using a gel permeation chromatograph (150, C, manufactured by Waters Co.).
    Column: TSK gel GMH-HT
    Measuring temperature: set at 145° C.
    Measuring concentration: 10 mg/10 ml orthodichlorobenzene Reference Example (Synthesis of transition metal compoumd: dimethylsilyl(tetramethylcyclopentadienyl)(3-tert-butyl-5-methyl-2-phenoxy)titanium dichloride (1) Synthesis of 1-bromo-3-tert-butyl-5-methyl-2-phenol Under a nitrogen atmosphere, 20.1 g (123 mmol) of 2-tert-butyl-4-methylphenol was dissolved in 150 ml of toluene in a 500 ml four-necked flask equipped with a stirrer, and 25.9 ml (18.0 g, 246 mmol) of tert-butylamine was then added. This solution was cooled to −70° C. and 10.5 ml (32.6 g, 204 mmol) of bromine was added to the solution. The mixture was stirred for 2 hours at −70° C. Thereafter, the mixture was heated to room temperature and washed three times by adding 100 ml of 10% diluted hydrochloric acid every washing. After washing, the resulting organic layer was dried by using anhydrous sodium sulfate and the solvent was removed by using an evaporator. Then, the organic layer was purified by using a silica gel column to obtain 18.4 g (75.7 mmol) of 1-bromo-3-tert-butyl-5-methyl-2-phenol as a colorless oil. The yield was 62%.

(2) Synthesis of 1-bromo-3-tert-butyl-2-methoxy-5-methylbenzene

Under a nitrogen atmosphere, 13.9 g (57.2 mmol) of 1-bromo-3-tert-butyl-5-methyl-2-phenol synthesized in the above (1) was dissolved in 40 ml of acetonitrile in a 100 ml four-necked flask equipped with a stirrer, and 3.8 g (67.9 mmol) of potassium hydroxide was then added. Furthermore, 17.8 ml (40.6 g, 286 mmol) of methyl iodide was added, followed by continuous stirring for 12 hours. Then, the solvent was removed by using an evaporator and 40 ml of hexane was added to the residue, thereby to extract the hexane soluble matter. The extraction was repeated three times. The solvent was removed from the extract to obtain 13.8 g (53.7 mmol) of 1-bromo-3-tert-butyl-2-methoxy-5-methylbenzene as a pale yellow oil. The yield was 94%.

(3) Synthesis of (3-tert-butyl-2-methoxy-5-methylphenyl) chlorodimethylsilane

To a solution of tetrahydrofuran (31.5 ml), hexane (139 ml) and 1-bromo-3-tert-butyl-2-methoxy-5-methylbenzene (45 g) synthesized in the above (2), a hexane solution (115 ml) of n-butyllithium (1.6 mol/liter) was added dropwise at −40° C. over 20 minutes. After the resulting mixture was maintained at −40° C. for 1 hour, tetrahydrofuran (31.5 ml) was added dropwise.

To a solution of dichlorodimethylsilane (131 g) and hexane (306 ml), the mixture obtained above was added dropwise at −40° C. The resulting mixture was heated to room temperature over 2 hours, followed by stirring at room temperature for 12 hours.

The solvent and excess dichlorodimethylsilane were distilled off from the reaction mixture under reduced pressure, and the hexane soluble matter was extracted with hexane from the residue. Then, the solvent was distilled off from the resulting hexane solution to obtain 41.9 g of (3-tert-butyl-2-methoxy-5-methylphenyl) chlorodimethylsilane as a pale yellow oil. The yield was 84%.

(4) Synthesis of (3-tert-butyl-2-methoxy-5-methylphenyl) dimethyl(tetramethylcyclopentadienyl)silane To a solution of (3-tert-butyl-2-methoxy-5-methylphenyl) chlorodimethylsilane (5.24 g) synthesized in the above (3) and tetrahydrofuran (50 ml), tetramethylcyclopentadienyl lithium (2.73 g) was added at −35° C. and the mixture was heated to room temperature over 2 hours, followed by stirring at room temperature for 10 hours.

The solvent was distilled off from the resulting reaction mixture under reduced pressure, and the hexane soluble matter was extracted with hexane from the residue. Then, the solvent was distilled off from the resulting hexane solution under reduced pressure to obtain 6.69 g of (3-tert-butyl-2-methoxy-5-methylphenyl)dimethyl (tetramethylcyclopentadienyl)silane as an yellow oil. The yield was 97%.

(5) Synthesis of dimethylsilyl (tetramethylcyclopentadienyl) (3-tert-butyl-2-phenoxy)titanium dichloride To a solution of (3-tert-butyl-2-methoxy-5-methylphenyl) dimethyl(tetramethylcyclopentadienyl)silane (10.04 g) synthesized in the above (4), toluene (100 ml) and triethylamine (6.30 g), a hexane solution (19.0 ml) of n-butyllithium (1.63 mol/liter) was added dropwise at −70° C. Then, the mixture was heated to room temperature over 2 hours and maintained at room temperature for 12 hours.

Under a nitrogen atmosphere, the mixture obtained above was added dropwise to a toluene solution (50 ml) of titanium tetrachloride (4.82 g). The resulting mixture was heated to room temperature over 1 hour and heated under reflux for 10 hours.

The reaction mixture was filtered and the solvent was distilled off from the filtrate. The residue was recrystallized from a toluene-hexane mixed solvent to obtain 3.46 g of dimethylsilyl(tetramethylcyclopentadienyl)(3-tert-butyl-5-methyl-2-phenoxy)titanium dichloride as an orange prismatic crystal. The yield was 27%.

The spectrum data were as follows.

$^1$H-NMR (CDCl$_3$) δ 0.57 (s, 6H), 1.41 (s, 9H), 2.15 (s, 6H), 2.34 (s, 6H), 2.38 (s, 3H), 7.15 (s, 1H), 7.18 (s, 1H)$^{13}$C-NMR (CDCl$_3$) δ 1.25, 14.48, 16.28, 22.47, 31.25, 36.29, 120.23, 130.62, 131.47, 133.86, 135.50, 137.37, 140.82, 142.28, 167.74

Mass spectrum (CI, m/e)458

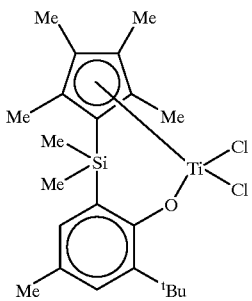

EXAMPLE 1

Using an autoclave type reactor having an internal volume of 1 liter, equipped with a stirring blade, ethylene and butene-1 were continuously fed in the reactor and polymerization was carried out. The polymerization conditions were set to the total pressure of 800 kg/cm$^2$G, the concentration of butene-1 of 29% by mol and the concentration of hydrogen of 0.12% by mol. A hexane solution (0.7 μmol/g) of dimethylsilyl (tetramethylcyclopentadienyl)(3-tert-butyl-5-methyl-2-phenoxy)titanium dichloride, a heptane solution (35 μmol/g) of triisobutylaluminum and N,N-dimethylaniliniumtetrakis(pentafluorophenyl)borate (obtained by atomizing according to a re-precipitation method using toluene and heptane, the particle size is from 2 to 3 μm and particles having the particle size of not less than 10 μm are not observed, 1.2 μmol/g) dispersed in a mixed solution (a volume ratio of heptane:liquid paraffin= 1:4) of heptane and liquid paraffin (Crystol 202, manufactured by Esso Sekiyu K.K., viscosity at 18° C.=130 cp) were prepared in separate vessels, and the respective ones were continuously fed in the reactor through a pipeline having a diameter of 3.175 mm at a feeding rate of 300 g/hour, 360 g/hour and 750 g/hour, respectively. The polymerization temperature was set to 230° C., a molar ratio of Al atom to Ti atom was set to 60, and a molar ratio of boron atom to Ti atom was set to 4.4. As a result, an ethylene-butene-1 copolymer having a melting point of 90.6° C., a molecular weight (Mw) of 64000 and a molecular weight distribution (Mw/Mn) of 1.7 was produced in a rate of 10 ton per one hour per mol of Ti atom.

EXAMPLE 2

Using an autoclave type reactor having an internal volume of 1 liter, equipped with a stirring blade, ethylene and butene-1 were continuously fed in the reactor and polymerization was carried out. The polymerization conditions were set to the total pressure of 800 kg cm$^2$G and the concentration of butene-1 of 45.9% by mol. Dimethylsilyl (tetramethylcyclopentadienyl)(3-tert-butyl-5-methyl-2-phenoxy)titanium dichloride was dissolved (0.066 μmol/g) in a mixed solution (a volume ratio of heptane:liquid paraffin=1:4) of heptane and liquid paraffin (Crystol 202, manufactured by Esso Sekiyu K.K.) and N,N-dimethylaniliniumtetrakis (pentafluorophenyl)borate (obtained by atomizing, according to a re-precipitation method using toluene and heptane, the particle size is from 2 to 3 μm and particles having the particle size of not less than 10 μm are not observed) was dispersed (0.4 μmol/g) in the solution. Furthermore, the resulting suspension was adjusted so that a molar ratio of boron atom to Ti atom becomes 6.0. This mixed suspension and a heptane solution (5.47 μmol/g) of triisobutylaluminum were prepared in separate vessels, and the respective solutions were continuously fed in the reactor through a pipeline having a diameter of 3.175 mm at a feeding rate of 323 g/hour and 240 g/hour, respectively. The polymerization reaction temperature was set to 205° C. and a molar ratio of Al atom to Ti atom was set to 61.7. As a result, an ethylene-butene-1 copolymer having a density (without annealing) of 0.873 g/cm$^3$, MFR of 6.8 g/10 min., a molecular weight (Mw) of 72000 and a molecular weight distribution (Mw/Mn) of 1.7 was produced in a rate of 98.4 ton per one hour per mol of Ti atom.

EXAMPLE 3

Using an autoclave type reactor having an internal volume of 1 liter, equipped with a stirring blade, ethylene and butene-1 were continuously fed in the reactor and polymerization was carried out. The polymerization conditions were set to a total pressure of 800 kg/cm$^2$G and a concentration of butene-1 of 47.0% by mol. Dimethylsilyl (tetramethylcyclopentadienyl)(3-tert-butyl-5-methyl-2-phenoxy)titanium dichloride was dissolved (0.066 µmol/g) in a mixed solution (a volume ratio of heptane:liquid paraffin=1:4) of heptane and liquid paraffin (Crystol 202, manufactured by Esso Sekiyu K.K.) and N,N-dimethylaniliniumtetrakis (pentafluorophenyl)borate (obtained by atomizing according to a re-precipitation method using toluene and heptane, the particle size is from 2 to 3 µm and particles having the particle size of not less than 10 µm are not observed) was dispersed (0.4 µmol/g) in the solution. Furthermore, the resulting suspension was adjusted so that a molar ratio of boron atom to Ti atom becomes 6.0. This mixed suspension and a heptane solution (5.47 µmol/g) of triisobutylaluminum were prepared in separate vessels, and the respective ones were continuously fed in the reactor through a pipeline having a diameter of 3.175 mm at a feeding rate of 373 g/hour and 283 g/hour, respectively. The polymerization reaction temperature was set to 206° C. and a molar ratio of Al atom to Ti atom was set to 63.3. As a result, an ethylene-butene-1 copolymer having a density (without annealing) of 0.867 g/cm$^3$, a melting point of 42.6° C. and a MFR of 11.8 g/10 min. was produced in a rate of 106.3 ton per one hour per mol of Ti atom.

EXAMPLE 4

Using an autoclave type reactor having an internal volume of 1 liter, equipped with a stirring blade, ethylene and butene-1 were continuously fed in a reactor and polymerization was performed. The polymerization conditions were set to a total pressure of 800 kg/cm$^2$G and a concentration of butene-1 of 43.9% by mol. Dimethylsilyl (tetramethylcyclopentadienyl)(3-tert-butyl-5-methyl-2-phenoxy)titanium dichloride was dissolved (0.066 µmol/g) in a mixed solution (a volume ratio of heptane:liquid paraffin=1:4) of heptane and liquid paraffin (Crystol 202, manufactured by Esso Sekiyu K.K.) and N,N-dimethylaniliniumtetrakis (pentafluorophenyl)borate (obtained by atomizing according to a re-precipitation method using toluene and heptane, the particle size is from 2 to 3 µm and particles having the particle size of not less than 10 µm are not observed) was dispersed (0.4 µmol/g) in the solution. Furthermore, the resulting suspension was adjusted so that a molar ratio of boron atom to Ti atom becomes 6.0. This mixed suspension and a heptane solution (5.47 µmol/g) of triisobutylaluminum were prepared in separate vessels, and the respective ones were continuously fed in the reactor through a pipeline having a diameter of 3.175 mm at a feeding rate of 290 g/hour and 270 g/hour, respectively. The polymerization reaction temperature was set to 205° C. and a molar ratio of boron atom to Ti atom was set to 77.2. As a result, an ethylene-butene-1 copolymer having a MFR of 13.3 g/10 min. was produced in a rate of 104.5 ton per one hour per mol of Ti atom.

EXAMPLE 5

Using an autoclave type reactor having an internal volume of 1 liter, equipped with a stirring blade, ethylene and hexene-1 were continuously fed in a reactor and polymerization was performed. The polymerization conditions were set to a total pressure of 796 kg/cm$^2$G and a concentration of hexene-1 of 29.7% by mol. A heptane solution obtained by mixing dimethylsilyl (tetramethylcyclopentadienyl)(3-tert-butyl-5-methyl-2-phenoxy)titanium dichloride and tri-isobutylaluminum (the concentrations of the complex and triisobutylaluminum are 0.37 µmol/g and 18.5 µmol/g, respectively, and a molar ratio of Al atom to Ti atom is 50) and a suspension (0.71 µmol/g) of triphenylmethyltetrakis (pentafluorophenyl)borate (a maximum particle diameter of 20 µm or less) atomized by wet pulverization, suspended in a mixture (a volume ratio of heptane:liquid paraffin=1:4) of heptane and liquid paraffin (Crystol 202, manufactured by Esso Sekiyu K.K.), were prepared in separate vessels, and the respective solutions were continuously fed in the reactor through a pipeline having a diameter of 3.175 mm at a feeding rate of 246 g/hour and 484 g/hour, respectively. The polymerization temperature was set to 210° C. and a molar ratio of boron atom to Ti atom was set to 3.6. As a result, an ethylene-hexene-1 copolymer having a MFR of 3.8 g/10 min. and a density (without annealing) of 0.889 g/cm$^3$ was produced in a rate of 28 ton per one hour per mol of Ti atom.

EXAMPLE 6

Using an autoclave type reactor having an internal volume of 1 liter, equipped with a stirring blade, ethylene and hexene-1 were continuously fed in a reactor and polymerization was carried out. The polymerization conditions were set to a total pressure was set to 796 kg/cm$^2$G and a concentration of hexene-1 of 31.6% by mol. A heptane solution obtained by mixing dimethylsilyl (tetramethylcyclopentadienyl)(3-tert-butyl-5-methyl-2-phenoxy)titanium dichloride and triisobutylaluminum (the concentrations of the complex and triisobutylaluminum are 2 µmol/g and 200 µmol/g, respectively, and a molar ratio of Al atom to Ti atom is 100) and a liquid paraffin (a mixture of Crystol 202(130 cp at 18° C.) manufactured by Esso Sekiyu K.K.:IP Solvent 2028 (3.2 cp at 19° C.) manufactured by Idemitsu Petrochemical Co., Ltd.=60:40 (% by volume)) suspension (7.0 µmol/g) of N,N-dimethylaniliniumtetrakis(pentafluorophenyl)borate atomized by wet pulverization (maximum particle diameter: not more than 20 µm) were prepared in separate vessels, and the respective ones were continuously fed in the reactor through a pipeline having a diameter of 3.175 mm at a feeding rate of 90 g/hour and 195 g/hour, respectively. The polymerization temperature was set to 220° C. and the molar ratio of boron atom to Ti atom was set to 7.6. As a result, an ethylene-hexene-1 copolymer having a MFR of 5.8 g/min., a density (without annealing) of 0.888 g/cm$^3$, a melting point of 69.8° C. and SCB of 32.6 was produced in a rate of 11 ton per one hour per mol of Ti atom.

EXAMPLE 7

Using an autoclave type reactor having an internal volume of 1 liter, equipped with a stirring blade, ethylene and hexene-1 were continuously fed in a reactor and polymerization was carried out. The polymerization conditions were set to a total pressure of 796 kg/cm$^2$G and a concentration of hexene-1 of 31.1% by mol. A heptane solution obtained by mixing dimethylsilyl(tetramethylcyclopentadienyl)(3-tert-butyl-5-methyl-2-phenoxy)titanium dichloride and tri-isobutylaluminum (the concentration of the complex and that of triisobutylaluminum are 0.37 µmol/g and 18.5 µmol/g, respectively, and the molar ratio of Al atom to Ti atom is 50) and a liquid paraffin (a mixture of Crystol 202 manufactured by Esso Sekiyu K.K.:IP Solvent 2028 manufactured by Idemitsu Petrochemical Co., Ltd.=60:40 (% by volume)) suspension (1.39 µmol/g) of N,N-dimethylaniliniumtetrakis (pentafluorophenyl)borate atomized by wet grinding (maximum particle diameter: not more than 20 µm) in a mixed solution were prepared in separate vessels, and the respective ones were continuously fed in the reactor through a pipeline having a diameter of 3.175 mm at a feeding rate of 745 g/hour and 1235 g/hour, respectively. The polymerization temperature was set to 247° C. and the molar ratio of boron atom to Ti atom was set to 6.22. As a result, an ethylene-hexene-1 copolymer having a MFR of 55 g/10 min. and a density (without annealing) of 0.886 g/cm$^3$ was produced in a rate of 13 ton per one hour per mol of Ti atom.

INDUSTRIAL APPLICABILITY

As described above, according to the present invention, there can be provided, in a method of producing an olefin polymer using a transition metal compound, a method not requiring use of an aromatic hydrocarbon solvent which is liable to remain in a polymer as the product and to give off an odor.

We claim:

1. A method for producing an olefin polymer, said method comprising:
    (1a) supplying (A) and (C), or (A), (B) and (C) described below as catalyst components in a catalyst preparation apparatus and supplying thus prepared catalyst for olefin polymerization in an olefin polymerization apparatus, or
    (1b) supplying (A) and (C), or (A), (B) and (C) described below as catalyst components in a polymerization apparatus to prepare a catalyst; and
    (2) homopolymerizing an olefin or copolymerizing two or more olefins in the presence of the thus prepared catalyst for olefin polymerization:
        (A) is a transition metal compound dissolved, suspended or slurried in an aliphatic hydrocarbon compound;
        (B) is triethylaluminum, triisobutylaluminum, methylaluminoxane or isobutylaluminoxane dissolved, wherein component (B) is suspended or slurried in an aliphatic hydrocarbon compound; and
        (C) is a suspension or slurry, wherein said suspension or slurry consists of at least one boron compound selected from the group consisting of:
            (C1) is a boron compound represented by the general formula BQ$^1$Q$^2$Q$^3$;
            (C2) is a boron compound represented by the general formula G$^+$(BQ$^1$Q$^2$Q$^3$Q$^4$)$^-$; and
            (C3) is a boron compound represented by the general formula (L-H)$^+$(BQ$^1$Q$^2$Q$^3$Q$^4$)$^-$,
            wherein,
                B represents a boron atom in the trivalent valence state;
                Q$^1$, Q$^2$, Q$^3$ and Q$^4$ may be the same or different and represent a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms;
                G$^+$ represents an inorganic or organic cation;
                L represents a neutral Lewis base; and
                (L-H)$^+$ represents a Bronsted acid,
            wherein component (C) is suspended or slurried in an aliphatic hydrocarbon compound.

2. A method for producing an olefin polymer, said method comprising:
    (1a) supplying (A) and (C), or (A), (B) and (C) described below as catalyst components in a catalyst preparation apparatus and supplying thus prepared catalyst for olefin polymerization in an olefin polymerization apparatus, or
    (1b) supplying (A) and (C), or (A), (B) and (C) described below as catalyst components in a polymerization apparatus to prepare a catalyst; and
    (2) homopolymerizing an olefin or copolymerizing two or more olefins in the presence of the thus prepared catalyst for olefin polymerization:
        (A) is a transition metal compound dissolved, suspended or slurried in an aliphatic hydrocarbon compound;
        (B) is a compound dissolved, suspended or slurried in an aliphatic hydrocarbon, wherein (B) is selected from the group consisting of (B1), (B2) and (B3)
            (B1) is an organoaluminum compound represented by the general formula E$^1_a$AlZ$_{3-a}$;
            (B2) is a cyclic aluminoxane having a structure represented by the general formula (—Al(E$^2$)—O—)$_b$; and
            (B3) is a linear aluminoxane having a structure represented by the general formula E$^3$(—Al(E$^3$)—O—)$_c$AlE$^3_2$,
            wherein
                E1, E2 and E3 respectively represent a hydrocarbon group having 1 to 8 carbon atoms, and all of E1, E2 and E3 may be the same or different;
                Z represents a hydrogen atom or a halogen atom, and all of Z may be the same or different;
                a represents a numeral satisfying 0<a≦3;
                b represents an integer of not less than 2; and
                c represents an integer of not less than 1; and
        (C) is a suspension or slurry, wherein said suspension or slurry consists of at least N,N-dimethylaniliniumtetrakis(pentafluorophenyl)borate or triphenylmethyltetrakis (pentafluorophenyl) borate, wherein component (C) is suspended or slurried in an aliphatic hydrocarbon compound.

3. A method for producing an olefin polymer according to any one of claim 1 or 3, wherein a maximum particle diameter of the boron compound in (C) is not more than 50 μm.

* * * * *